(12) United States Patent
Giver

(10) Patent No.: US 12,048,378 B2
(45) Date of Patent: Jul. 30, 2024

(54) INTERLOCKING MEANS AND PIECE OF FURNITURE COMPRISING THE SAME

(71) Applicant: IKEA SUPPLY AG, Pratteln (CH)

(72) Inventor: Markus Giver, Malmo (SE)

(73) Assignee: IKEA SUPPLY AG, Pratteln (CH)

( * ) Notice: Subject to any disclaimer, the term of this patent is extended or adjusted under 35 U.S.C. 154(b) by 476 days.

(21) Appl. No.: 17/281,660

(22) PCT Filed: Sep. 27, 2019

(86) PCT No.: PCT/SE2019/050925
§ 371 (c)(1),
(2) Date: Mar. 31, 2021

(87) PCT Pub. No.: WO2020/071982
PCT Pub. Date: Apr. 9, 2020

(65) Prior Publication Data
US 2022/0007843 A1    Jan. 13, 2022

(30) Foreign Application Priority Data

Oct. 1, 2018 (SE) .................................... 1851177-4

(51) Int. Cl.
*A47C 19/00* (2006.01)
*A47C 19/02* (2006.01)
(Continued)

(52) U.S. Cl.
CPC .......... *A47C 19/005* (2013.01); *A47C 19/025* (2013.01); *F16B 12/50* (2013.01); *F16B 12/54* (2013.01)

(58) Field of Classification Search
CPC ... A47C 19/005; A47C 19/025; A47C 19/021; A47C 19/024; F16B 12/50; F16B 12/54;
(Continued)

(56) References Cited

U.S. PATENT DOCUMENTS 2,730,419 A * 1/1956 Roberton ................ F16B 12/52
126/30
4,032,242 A    6/1977 Morris
(Continued)

FOREIGN PATENT DOCUMENTS

CN    1437546 A    8/2003
CN    1648472 A    8/2005
(Continued)

OTHER PUBLICATIONS

Chinese Office Action for CN Application No. 201980064794.9 mailed Jun. 10, 2022 (11 pages, with English translation).
(Continued)

*Primary Examiner* — Justin C Mikowski
*Assistant Examiner* — Alison N Labarge
(74) *Attorney, Agent, or Firm* — Merchant & Gould P.C.

(57) ABSTRACT

The present invention relates to an interlocking means for connecting a first panel, second panel and a leg of a piece of furniture with each other, wherein the interlocking means comprises an elongated element and a brace element. The elongated element comprises a portion configured to be attached to a first surface of the first panel and a first surface of the second panel and either a securing means configured to receive an interconnection element protruding from the leg or an interconnection element configured to match a securing means formed in the leg. The brace element comprises a portion configured to be attached to a second surface of the first panel and a second surface of the second panel and a through opening configured to receive the interconnection element.

14 Claims, 4 Drawing Sheets

(51) Int. Cl.
*F16B 12/50* (2006.01)
*F16B 12/54* (2006.01)

(58) Field of Classification Search
CPC .......... F16B 12/44; F16B 12/52; F16B 12/56; F16B 12/60
See application file for complete search history.

(56) References Cited

U.S. PATENT DOCUMENTS

| | | | |
|---|---|---|---|
| 5,465,533 A | 11/1995 | Rummo, Jr. et al. | |
| 7,631,375 B2 * | 12/2009 | Quintile | A47C 19/005 5/200.1 |
| 10,060,455 B2 | 8/2018 | Munch-Fals | |
| 2004/0199997 A1 * | 10/2004 | Harrow | A47C 19/021 5/282.1 |
| 2006/0195983 A1 | 9/2006 | Polevoy et al. | |
| 2014/0208506 A1 * | 7/2014 | Bartelsmeyer | A47C 19/005 5/400 |

FOREIGN PATENT DOCUMENTS

| | | | | |
|---|---|---|---|---|
| CN | 105705803 A | 6/2016 | | |
| DE | 29500500 U1 | 3/1995 | | |
| DE | 10116857 C1 | 9/2002 | | |
| DE | 10347882 B3 | 6/2005 | | |
| EP | 1559921 A1 | 8/2005 | | |
| FR | 2458701 A1 * | 1/1981 | ............... | F16B 12/46 |
| FR | 2688833 A1 * | 9/1993 | ........... | A47C 19/005 |
| FR | 2688833 A1 | 9/1993 | | |
| GB | 2391802 A * | 2/2004 | ........... | A47C 19/005 |
| JP | H02275105 A | 11/1990 | | |
| WO | 01/98154 A1 | 12/2001 | | |

OTHER PUBLICATIONS

1 European Search Report for Corresponding EP Application No. 19869513.2 mailed May 30, 2022 (7 pages).
International Search Report for International Application No. PCT/SE2019/050925 mailed Dec. 2, 2019 (4 pages).

* cited by examiner

INTERLOCKING MEANS AND PIECE OF FURNITURE COMPRISING THE SAME

This application is a National Stage Application of PCT/SE2019/050925, filed 27 Sep. 2019, which claims benefit of Serial No. 1851177-4, filed 1 Oct. 2018 in Sweden, and which applications are incorporated herein by reference. To the extent appropriate, a claim of priority is made to each of the above disclosed applications.

FIELD OF INVENTION

The present invention relates to an interlocking means for connecting two furniture panels, for example, panels of a mattress base of a bed, with each other. Further, the invention relates to a piece of furniture comprising such an interlocking means

BACKGROUND OF THE INVENTION

A common problem in designing and manufacturing furniture relates to the connection of panels with each other at a predetermined angle, for example, at a right angle. For example, in the art there are known configurations wherein a pair of lateral side panels and a pair of end panels are connected to each other by interlocking corner post braces.

Moreover, a mattress base for a bed is known that comprises two long side panels and two short side panels that are connected to each other by corner brackets that are tightened and held together by threaded rods extending through upper and lower brackets, respectively, and mating nuts. The mating nuts exhibit holes for connection with legs.

However, in known designs a relatively large number of separate elements has to be connected with each other and can only be connected by usage of different tools Therefore, there is still a need for simple and reliable means for connecting two furniture panels with each other at predetermined angle.

DESCRIPTION OF THE INVENTION

The present invention addresses the above-mentioned need by providing an interlocking means for connecting a first panel, second panel and a leg of a piece of furniture with each other, wherein the interlocking means comprises an elongated element and a brace element. The elongated element comprises a portion configured to be attached to a first surface of the first panel and a first surface of the second panel. The elongated element further comprises a securing means configured to receive an interconnection element protruding from the leg or an interconnection element configured to match a securing means formed in the leg. The brace element comprises a portion configured to be attached to a second surface of the first panel and a second surface of the second panel and a through opening, for example, comprising a threaded hole, configured to receive the interconnection element (protruding from the leg or the elongated element). The elongated element and the brace element are formed as to two separate, individual pieces. The first and second panels may be secured to each other at a right angle. In the secured stage the first surfaces may be upper surfaces and the second surfaces may be lower surfaces of the panels. In particular, the first and second panels can be end and side panels of a mattress base of a bed, for example, a box spring bed.

Due to such a configuration the interlocking means allows for securing the first panel, the second panel and the leg to each other simply by securing the interconnection element through the through hole to the securing means.

According to an embodiment the securing means is or comprises a threaded hole and the interconnection element is or comprises a screw for a reliable connection of the individual elements to each other. In this embodiment the interlocking means allows for securing the first panel, the second panel and the leg to each other simply by screwing the screw through the through hole into the threaded hole.

According to another embodiment the securing means and the interconnection element form a bayonet coupling with the securing means being the female receptor and the interconnection element being the male connector of the bayonet coupling.

The elongated element may comprise an angular sheet element or a solid beam element configured to abut to a third surface of the first panel and a third surface of the second panel. In this case, the first threaded hole is formed in a lower surface of the angular sheet element or solid beam element. Employment of a solid beam element usually results in a more stable assembled frame configuration though an angular sheet element is usually cheaper. In the secured stage of the panels the third surfaces may be inner surfaces (facing to a space partially built by the panels) of the panels.

According to a particular embodiment the elongated element comprises collar portions configured to be attached to the first surfaces of the first and second panels. Guiding pins protruding (in a downward direction) from the collar portions may be provided as location means that allow for an accurate positioning of the elongated element with respect to the first and second panels. The guiding pins can be inserted into corresponding blind bores formed in the first surfaces of the first and second panels.

The brace element of the inventive interlocking means may comprise a substantially flat (main) surface wherein the through hole is formed. Guiding pins protruding (in an upward direction) from the substantially flat surface of the brace element may be provided as location means and facilitate the positioning of the elongated element with respect to the first and second panels. The guiding pins can be inserted into corresponding blind bores formed in the second surfaces of the first and second panels.

In the above examples, the first and second panel may be configured to carry a mattress supporting panel, in particular, a slatted frame. Alternatively or additionally, the brace element may comprise a portion configured to carry a mattress supporting panel, in particular, a slatted frame.

Furthermore, it is provided a piece of furniture that can be built using the interlocking means of one of the above-described examples. The piece of furniture can be a mattress base for a bed, for example, a box spring bed, or a bed, for example, a box spring bed comprising a mattress base built using the interlocking means of one of the above-described examples. The piece of furniture comprises a first panel, a second panel, a leg and an interlocking means according to one of the above-described examples.

Particularly, the first panel may be secured at a first end of the first panel to a second end of the second panel by the interlocking means and both the first and the second panel may be secured to the leg by the interlocking means, wherein the interlocking means is in a state of coupling with the leg by means of the interconnection element and the securing means. It goes without saying that in this state the first threaded hole and the through hole are aligned with each other in order to accommodate the interconnection element. In an embodiment in that the elongated element is or comprises a screw and the securing means is or comprises a threaded hole in the state of coupling the screw penetrates through the through hole and is screwed into the threaded hole. The elongated element may abut an inner surface and an upper of the first panel and an inner surface and an upper surface of the second panel, respectively. The brace element may abut an upper surface of the leg, a lower surface of the first panel and a lower surface of the second panel. The first and second panels may abut each other at a right angle. The terms "upper", "lower" and "inner" characterize the surfaces in the assembled stage of the piece of furniture. The lower surface is closer to the leg than the upper surface.

Thereby, a stable configuration of a piece of furniture can easily be formed and also easily be disassembled again by an appropriate operation, for example, a screwing operation, if the elongated element is or comprises a screw and the securing means is or comprises a threaded hole.

The above-mentioned need is also addressed by a method of manufacturing a piece of furniture, for example, a mattress base for a bed, in particular, a box spring bed, wherein the method comprises the steps of:

providing an interlocking means according to one of the above-described examples;

providing a first panel having a first upper surface, a first lower surface and a first inner surface;

providing a second panel having a second upper surface, a second lower surface and a second inner surface;

providing a leg;

attaching the interlocking means to the first panel and the second panel comprising attaching the elongated element of the interlocking means to the first upper surface, the second upper surface, the first inner surface and the second inner surface and attaching the brace element of the interlocking means to the first lower surface and the second lower surface; and securing the interconnection element to the securing means through the through opening thereby securing the first panel, the second panel and the leg to each other.

In an embodiment in that the elongated element is or comprises a screw and the securing means is or comprises a threaded hole the step of securing comprises screwing the screw through the through hole into the threaded hole. In an embodiment in that the elongated element is a male connector of a bayonet coupling and the securing means is a female receptor of the bayonet coupling the step of securing comprises fastening the bayonet coupling.

Again, the terms "upper", "lower" and "inner" characterize the surfaces in the assembled stage of the piece of furniture. The lower surface is closer to the leg than the upper surface.

Before the step of securing the securing means and the through opening of the brace element are aligned with each other. The brace element can be loosely attached to the first lower surface and the second lower surface of the first and second panels in the sense that the attachment does not involve any screwing, nailing, tacking, clamping or the like. Similarly, the elongated element may be attached loosely to the first upper surface, the second upper surface, the first inner surface and the second inner surface of the first and second panels.

Due to the configuration of the interlocking means the first and second panels and the leg can be secured to each other by one single securing operation, for example, screwing operation, without the need for any additional (screwing) operation. A relatively small number of components is needed to from the configuration. The first and second panels may be secured to each other at a right angle.

According to an embodiment of the method of manufacturing a piece of furniture the attaching of the elongated element to the first upper surface, the second upper surface, the first inner surface and the second inner surface comprises inserting first guiding pins protruding from collar portions of the elongated element into blind bores formed in the first upper surface of the first panel and into blind bores formed in the second upper surface of the second panel and/or the attaching of the brace element to the first lower surface and the second lower surface comprises inserting second guiding protruding from a main surface of the brace element into blind bores formed in the first lower surface of the first panel and into blind bores formed in the second lower surface of the second panel. Using the guiding pins and blind bores as location means allows for accurately positioning the elongated element and brace element and aligning the first and second blind bores with each other.

Additional features and advantages of the present invention will be described with reference to the drawings. In the description, reference is made to the accompanying figures that are meant to illustrate preferred embodiments of the invention. It is understood that such embodiments do not represent the full scope of the invention.

The present invention provides means for connecting furniture panels with each other, particularly, at a right angle. In the following the means are described in the context of designing and manufacturing a mattress base but is to be understood that the invention is not restricted to this particular application. For example, the described means can also suitably be used in the design and manufacture of a sofa, a chair, a table, a dresser, a cupboard, etc.

Figure 1:
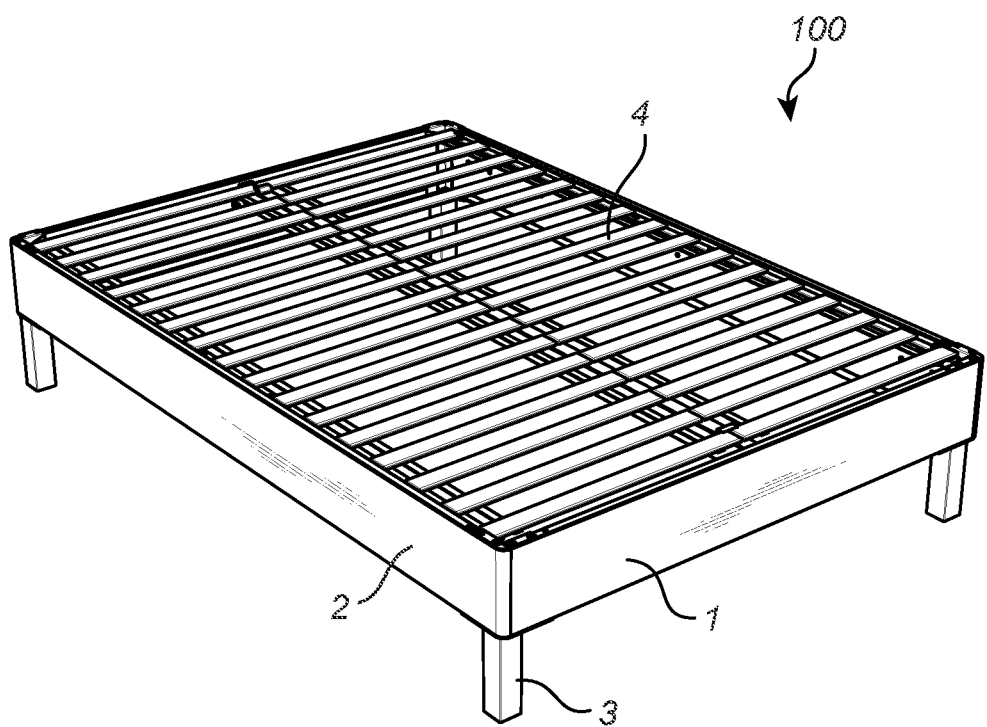
FIG. 1 illustrates a mattress base for a bed that can be built in accordance with an embodiment of the present invention.

FIG. 1 shows an exemplary mattress base 100, for example, a mattress base 100 for a box spring bed. The mattress base 100 comprises two end panels 1 spaced apart from each other and two side panels 2 spaced apart from each other and made longer than the end panels 1. The end panels 1 are secured to ends of side panels 2 in a manner described below. Legs 3 are connected to the end panels 1 and side panels 2. Moreover, a slatted frame 4 for supporting a mattress is provided as shown in FIG. 1. The end panels 1 and the side panels 2 can be made of or comprise solid wood, for example, pine wood or spruce wood, or layered glued wood such as layered glued birch. The legs 3 can also be formed of or comprise solid wood or iron steel, for example, stainless steel. The slatted frame 4 may comprise solid wood and/or synthetic materials.

Figure 2A:
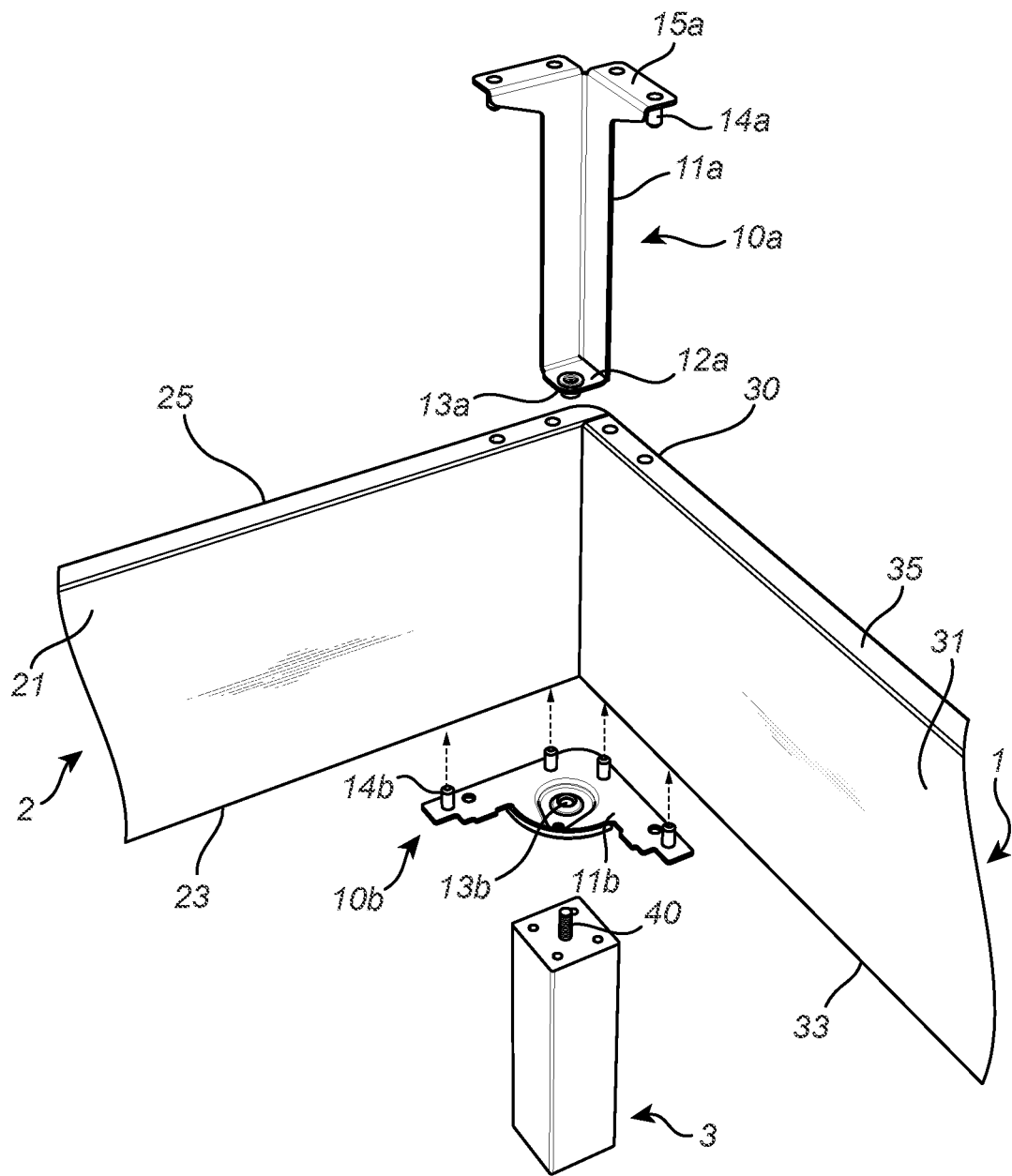
FIGS. 2A to 2C illustrate the connection of two panels of the mattress base shown in FIG. 1 with each other in accordance with an embodiment of the present invention.
Figure 2B:
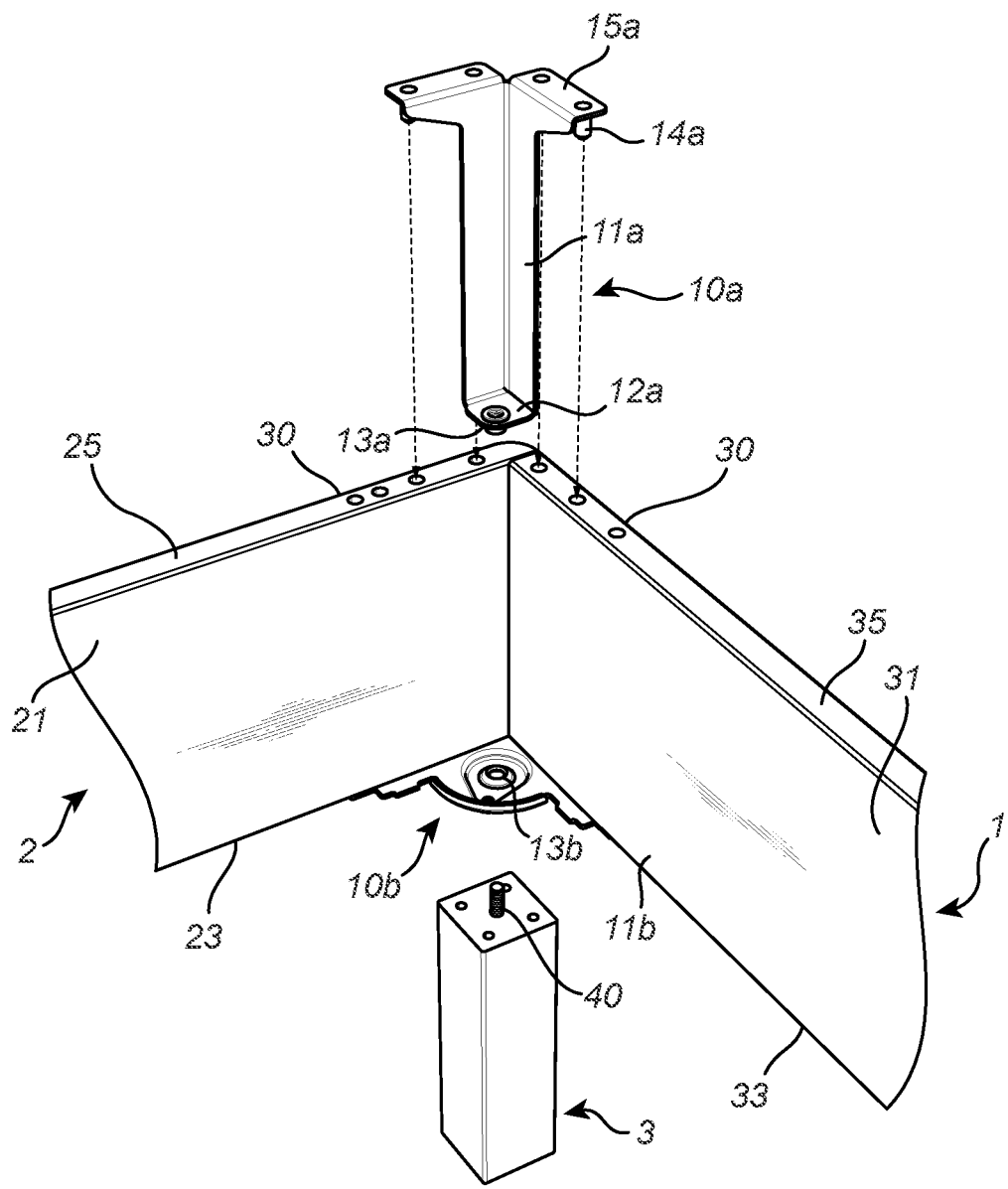
Figure 2C:
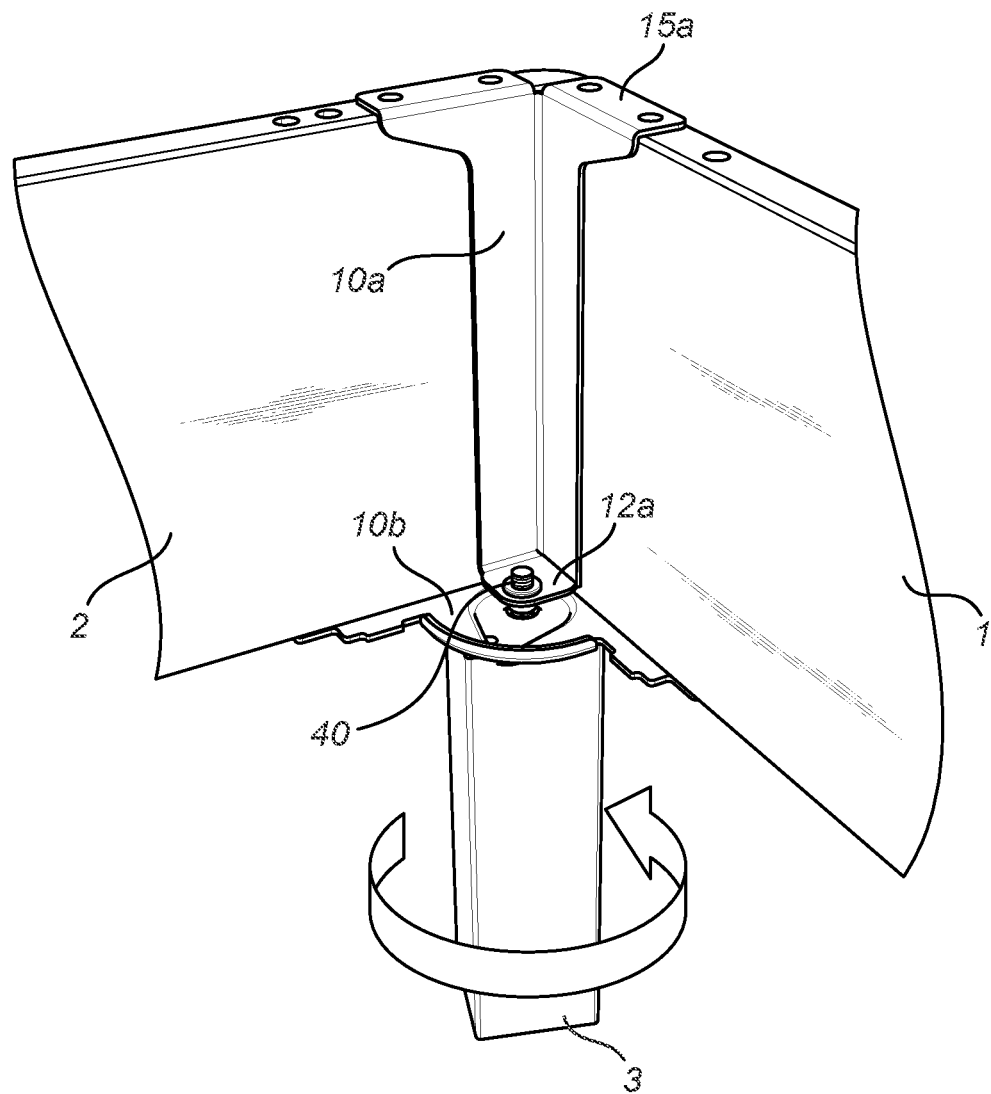

FIGS. 2A to 2C illustrates an interlocking means 10a, 10b for securing the end panels 1, side panels 2 and legs 3 to each other, respectively, according to an embodiment. The interlocking means 10a, 10b has two parts, namely, an elongated element 10a and a (corner) brace element 10b. The interlocking means 10a, 10b may be made of or comprise a metal material. The elongated element 10a can be provided in form of an angular sheet element or a solid beam element, in principle. The elongated element 10a has side portions 11a and bottom portion 12a of the elongated element 10a. The two side portions 11a are configured to abut an inner surface 31 of the end panel 1 and an inner surface 21 of the side panel 2, respectively. A threaded hole 13a is formed in a central region of the bottom portion 12a. The brace element 10b has a substantially flat main surface 11b and a through opening 13b, for example, in form of a threaded hole, is formed in a central region of the substantially flat main surface 11b. The leg 3, on the other hand, has a screw 40 mounted therein. The screw 40 may be made of stainless steel, for example, zinc-plated stainless steel.

The leg 3, the end panel 1 and the side panel 2 can be secured to each other by tightening the screw 40 in the threaded hole 13a of the bottom portion 12a of the elongated element 10a and through the through opening 13b of the substantially flat main surface 11b of the brace element 10b. Thus, by one and the same screwing operation indicated by the arrow in FIG. 2C (and, if necessary, using one single screwing tool) the leg 3, the end panel 1 and the side panel 2 can be secured to each other in abutting engagement using the interlocking means 10a, 10b. FIG. 2C shows a situation in that the screw 40 is already partly screwed into the threaded hole 13a and through the through opening 13b. A relatively small number of components is needed for arriving at the configuration shown in FIG. 2C.

In a state in which the leg 3 is completely fastened to the interlocking means 10a, 10b, i.e., after completion of the screwing operation, the leg 3 abuts the brace element 10b, the brace element 10b abuts the lower surfaces 33, 23 of the first panel 1 and the second panel 2, the first panel 1 and the second panel 2 abut each other and the elongated element 10a abuts the inner surfaces 31, 21 of the first panel 1 and the second panel 2 as well as the upper surfaces 35, 25 of the first panel 1 and the second panel 2.

In the example shown in FIG. 2A the substantially flat main surface 11b of the brace element 10b is provided with guiding pins (dowels) 14b that can be inserted in corresponding blind bores (not shown in FIG. 2A) that are formed in the lower surfaces 23,33 of the end panel 1 and the side panel 2. Accurate positioning of the brace element 10b can be guaranteed by the guiding pins 14b. Similarly, guiding pins (dowels) 14a of the elongated element 10a can be inserted in blind bores 30 that are formed in upper surfaces 25, 35 of the end panel 1 and the side panel 2 (see FIG. 2B). The guiding pins 14a of the elongated element 10a are formed on collar portions (15a) of the elongated element 10a.

By securing the legs 3 in interlocking engagement with the adjacent end panels 1 and side panels 2 by the interlocking means 10a, 10b a stable base can be achieved wherein distortions of the assembled configuration due to relative movement of the end panels 1 and side panels 2 when being handled and supporting loads in use can be prevented. In an assembled state the end panels 1 and side panels 2 are secured to each other at a predetermined angle, for example, an angle of 90°.

In the above-described embodiments a threaded hole 13a is formed in the bottom portion 12a of the elongated element 10a and the leg 3 is provided with a screw 40. Alternatively, a through hole can be formed in the leg 3 and a screw is formed in the bottom portion 12a of the elongated element 10a. In both alternatives the threaded hole 13a can be replaced by any other suitable securing means and the screw 40 can be replaced by any other suitable interconnection element. For example, the securing means may be a female receptor of a bayonet coupling and the interconnection element may be a male connector of the bayonet coupling.

All previously discussed embodiments are not intended as limitations but serve as examples illustrating features and advantages of the invention. It is to be understood that some or all of the above described features can also be combined in different ways.

The invention claimed is:

1. An interlocking means for connecting a first panel, a second panel and a leg of a piece of furniture with each other, comprising:
   an elongated element; and
   a brace element; wherein:
   the elongated element comprises:
      a portion configured to be attached to a first upper surface of the first panel and to a first upper surface of the second panel, and
      either a securing means configured to receive an interconnection element protruding from the leg or an interconnection element configured to match a securing means formed in the leg; and
   the brace element comprises:
      a portion configured to be attached to a second lower surface of the first panel and
      a second lower surface of the second panel, and
      a through opening configured to receive the interconnection element; and
   wherein the elongated element is configured to not extend over an outer surface of the first panel and to not extend over an outer surface of the second panel, and the brace element is configured to not extend over the outer surface of the first panel and to not extend over the outer surface of the second panel.

2. The interlocking means according to claim 1, wherein the securing means is or comprises a threaded hole and the interconnection element is or comprises a screw.

3. The interlocking means according to claim 1, wherein the elongated element comprises an angular sheet element or a solid beam element configured to abut a third inner surface of the first panel and a third inner surface of the second panel.

4. The interlocking means according to claim 1, wherein the elongated element comprises collar portions configured to be attached to the first surface of the first panel and the first surface of the second panel.

5. The interlocking means according to claim 4, wherein first guiding pins protrude from the collar portions.

6. The interlocking means according to claim 1, wherein the brace element comprises a flat main surface comprising the through opening.

7. The interlocking means according to claim 6, wherein second guiding pins protrude from the flat main surface.

8. A piece of furniture comprising:
   a first panel having a first upper surface, a first lower surface, a first inner surface, and a first outer surface;
   a second panel having a second upper surface, a second lower surface, a second inner surface, and a second outer surface;
   a leg; and
   an interlocking means comprising:
   an elongated element; and
   a brace element; and wherein
   the elongated element comprises:
      a portion configured to be attached to the first upper surface of the first panel and the first upper surface of the second panel, and
      either a securing means configured to receive an interconnection element protruding from the leg or an interconnection element configured to match a securing means formed in the leg; and
   the brace element comprises:
      a portion configured to be attached to the second lower surface of the first panel and to the second lower surface of the second panel, a through opening configured to receive the interconnection element; and wherein the elongated element is configured to not extend over the outer surface of the first panel and to not extend over the outer surface of the second panel, and the brace element is configured to not extend over the outer surface of the first panel and to not extend over the outer surface of the second panel.

9. The piece of furniture according to claim 8, wherein the first panel is secured at a first end of the first panel to a second end of the second panel abutting the first end of the first panel by the interlocking means and the first panel and the second panel are secured to the leg by the interlocking means, the interlocking means being in a state of coupling with the leg by means of the interconnection element and the securing means.

10. The piece of furniture according to claim 9, wherein in the state of coupling:

the leg abuts the brace element;

the brace element abuts a lower surface of the first panel and a lower surface of the second panel, the first panel and the second panel abut each other, in particular, at an angle of 90°; and the elongated element abuts an inner surface of the first panel, an upper surface of the first panel, an inner surface of the second panel and an upper surface of the second panel.

11. The piece of furniture according to claim 8, wherein the piece of furniture is a mattress base for a bed, in particular, for a box spring bed.

12. A bed, in particular, a box spring bed, comprising the piece of furniture according to claim 11.

13. A method of manufacturing a piece of furniture, in particular, a mattress base for a bed, with the steps of:

providing a first panel having a first upper surface, a first lower surface, and a first inner surface, and a first outer surface;

providing a second panel having a second upper surface, a second lower surface, and a second inner surface, and a second outer surface;

providing a leg;

providing an interlocking mean comprising:

an elongated element; and a brace element; and wherein the elongated element comprises:

a portion configured to be attached to the first upper surface of the first panel and the first upper surface of the second panel, and either a securing means configured to receive an interconnection element protruding from the leg or an interconnection element configured to match a securing means formed in the leg; and the brace element comprises:

a portion configured to be attached to the second lower surface of the first panel and to the second lower surface of the second panel, a through opening configured to receive the interconnection element; and wherein the elongated element is configured to not extend over the outer surface of the first panel and to not extend over the outer surface of the second panel, and the brace element is configured to not extend over the outer surface of the first panel and to not extend over the outer surface of the second panel;

attaching the interlocking means to the first panel and the second panel comprising attaching the elongated element to the first upper surface, the second upper surface, the first inner surface and the second inner surface and attaching the brace element to the first lower surface and the second lower surface; and securing the interconnection element to the securing means through the through opening thereby securing the first panel, the second panel and the leg to each other.

14. The method according to claim 13, wherein the attaching of the elongated element to the first upper surface, the second upper surface, the first inner surface and the second inner surface comprises inserting first guiding pins protruding from collar portions of the elongated element into blind bores formed in the first upper surface of the first panel and into blind bores formed in the second upper surface of the second panel; and/or the attaching of the brace element to the first lower surface and the second lower surface comprises inserting second guiding pins protruding from a flat main surface of the brace element into blind bores formed in the first lower surface of the first panel and into blind bores formed in the second lower surface of the second panel.

* * * * *